United States Patent

[11] 3,625,621

[72] Inventor Louis G. Fields
 Los Angeles, Calif.
[21] Appl. No. 849,572
[22] Filed July 30, 1969
[45] Patented Dec. 7, 1971
[73] Assignee Calbiochem
 Los Angeles, Calif.
 Continuation of application Ser. No.
 340,943, Jan. 29, 1964, now abandoned.
 This application July 30, 1969, Ser. No.
 849,572

[54] OPTICAL DENSITOMETER
 7 Claims, 3 Drawing Figs.
[52] U.S. Cl. .................................................. 356/206,
 250/218, 356/201, 356/204, 356/223
[51] Int. Cl. ................................................. G01n 21/24
[50] Field of Search ........................................... 356/206,
 223, 201, 204–206, 229; 250/218

[56] References Cited
 UNITED STATES PATENTS
| | | | |
|---|---|---|---|
| 2,073,223 | 3/1937 | Rose | 356/180 |
| 2,193,437 | 3/1940 | Summerson | 88/14 (CNC) |
| 2,984,146 | 5/1961 | Kwart et al. | 88/14 (SA) |
| 2,406,716 | 8/1946 | Sweet | 88/14 (VC) |
| 2,478,163 | 8/1949 | Sweet | 88/14 (VC) X |
| 2,703,505 | 3/1955 | Senn | 88/14 (A) |
| 2,939,361 | 6/1960 | Hock | 88/14 (ZT) |
| 3,241,431 | 3/1966 | Brutten et al. | 88/14 (ZT) |
| 3,344,702 | 10/1967 | Wood et al. | 88/14 (ZT) |

OTHER REFERENCES

Nilsson: A Linearly Responding Dichromatic Curvette Densitometer for Dye-dilution Curves, Scandinavian Journal of Clinical and Laboratory Investigation (supplement 69) volume 15, 1963 pages 181– 192

*Primary Examiner*—William L. Sikes
*Assistant Examiner*—F. L. Evans
*Attorneys*—Marvin Jabin, Jabin & Jabin and John H. Tregoning ABSTRACT: The optical densitometer of the present invention includes a photoresistive element which has a nonlinear relationship between resistance and incident light. A source of light directs light energy through the specimen to be measured and onto the photoresistive element. The intensity of the light from the specimen also varies nonlinearly in accordance with the optical density of the specimen. These nonlinear variations are correlated so that the optical densitometer of the present invention produces an output reading which is directly proportional to the optical density of the specimen which in turn is proportional to the chemical concentration in the specimen. The present invention also includes the use of a pair of such nonlinear photoresistive cells in a bridge circuit with both cells responsive to a common light source but wherein only one cell is responsive to the light through the specimen. The use of two photoresistive cells compensates for any variation in the output from the light source. The present invention in addition includes the use of diode voltage limiting means across the indicating meter used to determine when the bridge is balanced so as to protect the indicating meter.

INVENTOR
Louis G. Fields
Attorneys

OPTICAL DENSITOMETER

This is a continuation of application Ser. No. 340,943 filed Jan. 29, 1964, now abandoned.

The present invention relates generally to instruments, and more particularly to optical densitometers for measuring the optical density of substances.

Under some circumstances, it is desirable to be able to measure the optical density of a substance. For example, if it is desired to determine the amount of a particular component present in a mixture or the rate at which that component is changing the optical density of the mixture may be measured at a wavelength that corresponds to an absorption line of the component. The amount of the component may then be computed since the optical density will be a function of the quantity of the unknown component present. One area where this form of measuring is widely used is in the assaying of biological or pathological serums. When making such as assay a reagent is mixed with the specimen or serum whereby a chemical or enzymatic reaction occurs within the specimen. This reaction will involve the component to be measured and will cause one or more chemicals in the specimen to be converted into another chemical. The reagent is so constructed that the chemical being consumed or the chemical being produced has a unique absorption line at a particular wavelength. Furthermore, the reagent is compounded so that the only factor limiting the reaction is the quantity of the unknown component originally present.

By measuring the optical density of the specimen it will then be possible by a simple formula to determine the amount of the unknown. One means that has been proposed for measuring the optical density is to employ an optical densitometer that can measure the optical density at the desired wavelength. At the present time there are several different kinds of optical densitometers that are capable of measuring the optical density of a specimen for the foregoing type of measurement. However, heretofore all of these optical densitometers have been extremely complex and expensive. Also they have required a substantial amount of skill to operate them with a satisfactory degree of precision. In addition, when the optical density of the specimen becomes very large, the accuracy of the optical densitometer becomes limited. In other words, when the specimen is nearly opaque and the amount of light transmitted therethrough becomes very small, the sensitivity of the optical densitometers have been such that it is very difficult if not impossible to measure small changes in the optical density. It is a characteristic of these optical densitometers that they are actually measuring the percent of transmission of the light within the optical density being a logarithm thereof. As a result, heretofore to obtain a linear scale it has been necessary to calibrate in percentage of transmission and convert this into an optical density reading suitable for use in computing the unknown. If the instrument is calibrated in optical density the conversion step is eliminated but the scale becomes nonlinear with the readings being crowded at one end of the scale. As a result optical densitometers available heretofore have been difficult to use and their readings have tended to be unreliable when the specimen has a high optical density.

It is the purpose of the present invention to overcome the foregoing difficulties. More particularly, it is proposed to provide an optical densitometer which is particularly adapted to measure the optical density of a specimen and which is not only inexpensive to manufacture but is also very simple and easy to operate by a person of very limited skill. It is also proposed to provide an optical densitometer that has a linear scale that indicates directly the optical density of the specimen and is accurate throughout its entire operating range including high densities where the specimen is very opaque. This is to be accomplished by providing an optical densitometer that will project light of the desired wavelength through the specimen whereby the light passing through the specimen will be attenuated as a function of the optical density. The optical densitometer includes pickup means which measure the amount of attenuation and become progressively more sensitive as the amount of attenuation increases i.e. the opaqueness of the specimen increases and the light decreases. This will not only permit the very accurate measurement of the optical density of a specimen at extremely high values but will also permit the indicator to be calibrated in unit of optical density but still have a linear scale which may be easily read at all portions of the scale.

These and other features and advantages of the present invention will become readily apparent from the following detailed description of one embodiment thereof, particularly when taken in connection with the accompanying drawings wherein like reference numerals refer to like parts and wherein.

Figure 2:
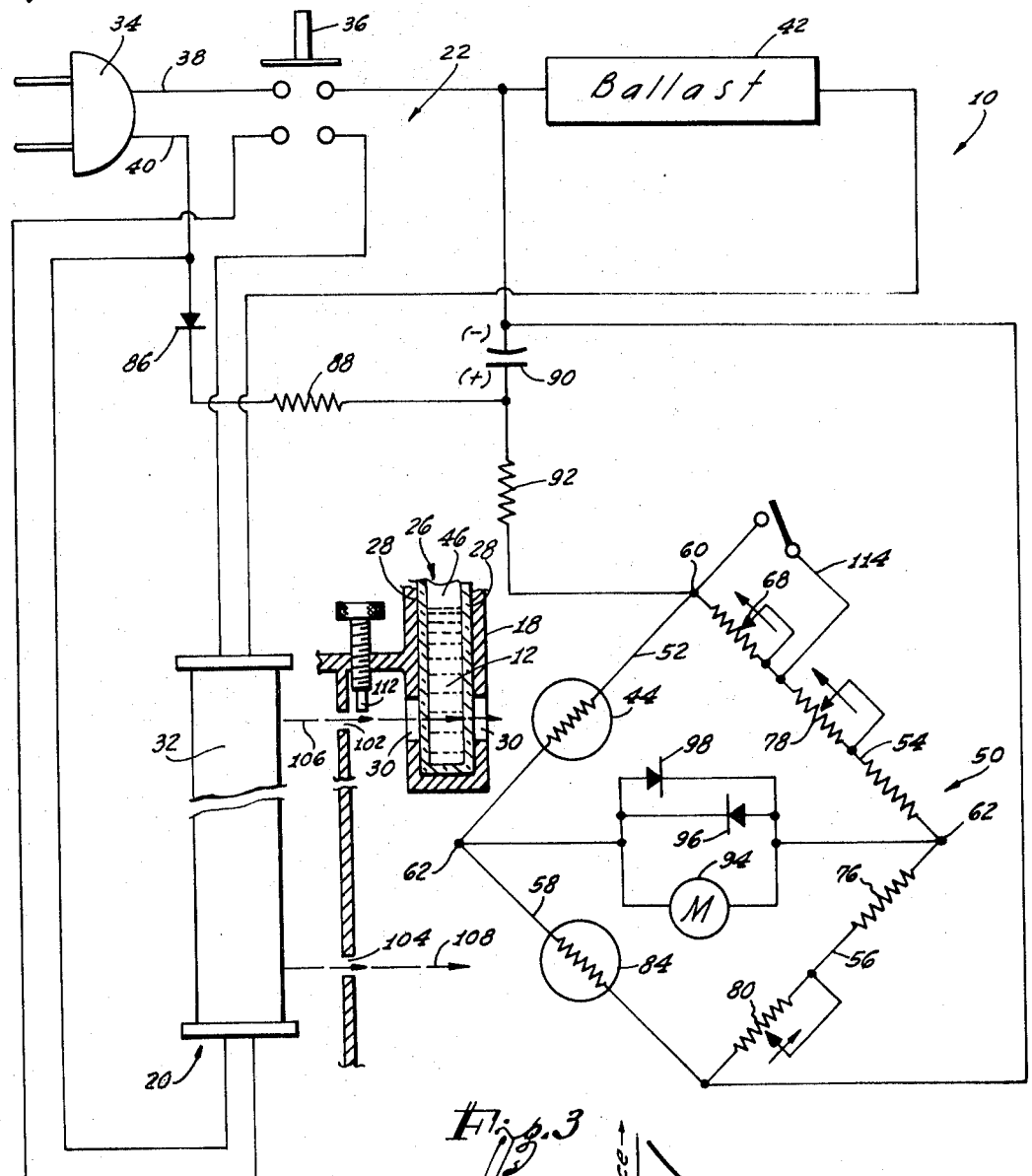
FIG. 2 is a schematic diagram of the optical densitometer of FIG. 1.

Referring to the drawings in more detail, the present invention is particularly adapted to be embodied in an instrument such as an optical densitometer 10 for measuring the optical density of a specimen 12. The present instrument or optical densitometer 10 is enclosed in a suitable housing 14 having a face 16 on the front thereof. A receptacle 18 for receiving a specimen with an unknown optical density is provided inside of the housing 14. The receptacle 18 may extend upwardly of the housing 14 so as to form an opening that will permit a container with the specimen therein to pass through the opening and into the receptacle 18. In addition, as may be seen in FIG. 2, the optical densitometer 10 includes a source of light 20, a power supply section 22 and a comparator or measuring section 24.

The receptacle 18 for receiving the specimen 12 may be of any desired variety that is suitable for retaining the specimen 12 in a fixed position and allowing light from the source 20 to be directed completely therethrough. The receptacle 18 is positioned so that it will form an opening adjacent the top of the instrument 10 so that an operator may easily insert and remove the specimen from the instrument. Normally, the specimen 12 will be in a liquid form. Accordingly, the specimen 12 may be contained in an easily handled test tube 26. The test tube 26 should consist of a material transparent to light of the wavelength at which the optical density is to be measured. The present receptacle 18 will accordingly have a passage that extends axially and is just large enough to receive the test tube 26 and retain it in a fixed position. It has been found desirable for the test tube 26 to have a pair of parallel flat sides 28 that will be retained normal to the light passing through the specimen 12.

It may thus be seen that the present receptacle 18 includes a rigid member having a plurality of flat sidewalls that are spaced to form a square passage that opens through the top of the instrument 10. The test tube 26 may then be filled with the specimen 12 to some predetermined level and then inserted into the receptacle 18.

A pair of aligned openings 30 may be provided in the opposite sides of the receptacle member so that light may pass freely therethrough. These openings 30 are disposed sufficiently close to the bottom of the receptacle 18 to insure the specimen 12 in the test tube 26 extending above the openings 30.

The light source 20 may be of any variety that is capable of radiating light that may be directed through the aligned openings 30 and through a specimen 12 contained in a test tube 26 disposed inside of the receptacle 18. The particular light source that is used will depend to some extent upon the wavelength of the absorption line or band where the optical density is to be measured. If the absorption wavelength is in the infrared or visible light region, a lamp capable of producing light at that wavelength must be used. If it is desired to measure the optical density in the ultraviolet region, a suitable source of ultraviolet may be provided.

If it is desired to measure the quantity of an unknown substance in a pathological or biological specimen, a reagent may be mixed with the specimen to cause an enzymatic reaction to occur whereby a compound having a known absorption line or band will be converted as a function of the quantity of the unknown substance. By measuring the optical density at the wavelength of the absorption line for the compound, a determination may be made of the unknown. The wavelength of the absorption line or band will, of course, depend upon the particular substances employed in producing the reaction. However, if by way of example the absorption band is the ultraviolet region, a fluorescent light may be employed. A fluorescent light will naturally produce large quantities of ultraviolet light. However, by a choice of fluorescent materials, the wavelength and intensity of the light may be modified to be equal to that of the absorption band. By way of example, if it is desired to measure the optical density in the ultraviolet region, the lamp may be a small fluorescent lamp 32 in the range of about 4 watts.

The power supply section 22 includes an input such as a conventional male plug 34 that may be plugged into a socket leading to a suitable source of power, for example, a standard 110 volt, 60 cycles per second power line. As will become apparent, even though there may be fluctuations in the voltage on the supply line that will cause substantial variations in the intensity of the light, the present optical densitometer 10 will still be capable of producing accurate measurements. Accordingly, there is no longer any necessity for providing expensive voltage regulators, etc., in the power supply section 22 for stabilizing the voltage at a fixed level. As a result, the power supply section 22 may be much simpler, lighter weight and cheaper than has been possible heretofore.

A conventional double-pole, single-throw switch 36 may be provided in the pair of conductors 38 and 40 that leads to the plug. This switch 36 may project from the face 16 for turning the optical densitometer 10 "ON" and "OFF."

The fluorescent lamp 32 may be interconnected with the conductors 38 and 40 and the switch 36 in the power supply section 22 by means of a ballast 42 in a conventional manner. It may thus be seen that when the switch 36 is open, the fluorescent lamp 32 will be extinguished. However, when the switch 36 is closed, the fluorescent lamp 32 will become luminous and direct light of the desired wavelength toward and through the openings 30 in the side of the receptacle 18. If a test tube 26 is in the receptacle 18, the light will also pass through any specimen 12 in the test tube 26. The intensity of the light that has passed through the specimen 12 will be attenuated as a function of the optical density of the specimen 12.

The comparator or measuring section 24 includes a pickup means that are responsive to light in the region of the absorption line or band. Although the pickup means may be of any suitable variety, in the present instance, it is a photocell 44 of the photoconductive or photoresistive variety. The construction and operation of such photocells are well known in the art. They have a resistance that is a function of the quantity or intensity of the light incident thereon. The rate at which the resistance varies will, of course, be determined by the manner in which the photocell 44 is constructed and particularly by the materials used in such construction. Most photocells have a reasonably linear change of resistance in response to the light changes. However, for reasons that will become apparent subsequently, in the present instance it is desirable that the photocell 44 have a nonlinear response similar to that shown in FIG. 3. When the incident light is zero, the photocell 44 will have some predetermined maximum level. When the light begins to increase from the zero level, very small changes in the light intensity will produce very large changes in the amount of resistance. As the light intensity increases, the rate at which the resistance decreases will gradually decrease. Eventually, the resistance will asymptotically approach a minimum level at the high intensities. The region 46 of the response curve 48 beginning near the very low intensities on up to a substantial level will be of a substantially logarithmic shape. This is the portion of the curve 48 that it is desired to employ.

It may thus be seen that the rate of change of resistance of the photocell 44 is the greatest when the intensity of the light is lowest. Conversely stated, the rate of change of resistance will be the smallest when the intensity of the light is highest.

Figure 3:
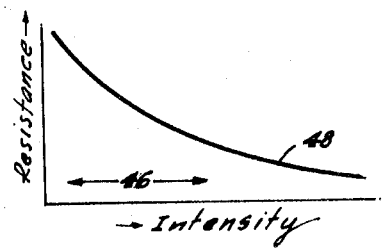
FIG. 3 is a graph of the response characteristic of one portion of the optical densitometer.
Figure 1:
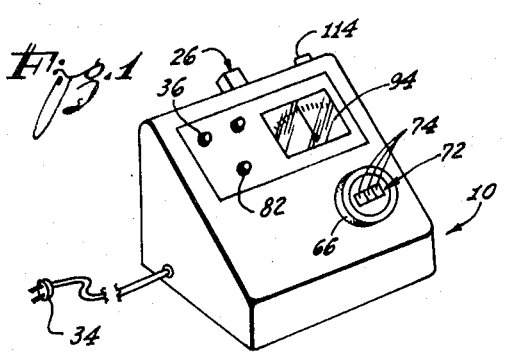
FIG. 1 is a perspective view of an optical densitometer embodying one form of the present invention.

Photoresistive cells of this nature are well known in the art and can be readily obtained from many sources. Photocells including cadmium sulfide or cadmium selenide and other compounds can be made to exhibit this type of response. A particular photocell that is responsive to ultraviolet light in the regions produced by a fluorescent lamp and has a response curve similar to FIG. 3 is the so-called CL-505 sold by the Clairex Corporation.

The photocell 44 may be disposed adjacent the receptacle 18 or specimen holder on the side thereof opposite from the lamp 32. The photocell 44 is positioned in substantial alignment with the openings 30. The photocell 44 may also be shielded so that the only light that can reach the photocell 44 is the light that first passes through any test tube 26 and specimen 12 disposed in the receptacle 18. As a consequence, the intensity of the light incident on the photocell 44 will be attenuated from the intensity of the light entering the specimen 12 as a function of the optical density of the specimen 12 at the wavelength of the light from the lamp 32. The resistance of the cell 44 will, in turn, be a function of the optical density of the specimen 12.

The comparator or measuring section 24 of the instrument is effective to measure the resistance of the photocell 44 and can thereby indicate the optical density of the specimen. Although the resistance of the cell 44 may be measured by a wide variety of means, in the present instance a so-called Wheatstone bridge 50 is employed. A Wheatstone bridge is a well-known electrical circuit having four separate sides 52, 54, 56 and 58 that are electrically interconnected to form an "electrical square" having a first pair of opposite corners 60 and a second pair of opposite corners 62.

The first side 52 of the bridge 50 includes the photocell 44. This side 52 will thus have a resistance determined by the resistance of the photocell 44 which, as pointed out before, is a function of the optical density of the specimen 12.

The second side 54 of the bridge 50 includes at least one resistor. One of these resistors 64 is a variable resistor that is controlled by manually manipulating a control knob 66 on the outside of the housing 14. The resistor 64 includes a movable contact 68 that is electrically connected to the resistor 64 and that is mechanically connected with the control knob 66. The contact 68 is also electrically connected to one end of the resistor 64 and will thereby short out the portion of the resistor.

When the operator manually rotates the knob 66, the contact 68 will electrically slide across the resistance 64 and thereby vary the resistance of the second side 54. The control knob 66 may also be mechanically connected to a suitable indicator 72. The present indicator 72 is disposed inside of the control knob 66 and includes three separate decimal indicator wheels. Each of these wheels includes a series of indicia 74 that will successively become aligned with the windows in the center of the knob 66. The indicator wheels are connected with the control knob 66 so that turning the knob 66 will be effective to simultaneously vary the setting of the movable contact 68 and the indicator wheels. Although the indicia 74 may be calibrated to indicate any desired units, in the present instance they are calibrated to indicate optical density. For reasons that will be explained subsequently, even though the indicia indicate optical density, they are linearly spaced in the present optical densitometer. The indicator wheels are precisely controlled in accordance with the setting of the movable contact 68 and is calibrated with any desired indicia.

The third side 56 of the bridge 50 may be formed by a resistance 76 that complements the resistance of the second side 54. It should be noted that either one or both of the sides 54 and 56 may have trimmer potentiometers 78 and 80 therein.

These trimmer potentiometers 78 and 80 are adjustable through a narrow range that will permit balancing of the two sides 54 and 56. One of the potentiometers 78 may be adjustable by means of a screwdriver connection on the back of the optical densitometer housing 14. The other potentiometer 80 may be adjusted by a zero set knob 82 on the face 16 of the housing 14.

The fourth side 58 of the bridge 50 includes a resistance that will complement the resistances in the other sides of the bridge 50 whereby the bridge 50 may be balanced. This resistor may have a constant resistance. However, as previously noted, there is no voltage regulation in the power supply section 22 and, as a consequence, the intensity of the lamp 32 may tend to fluctuate over a very wide range. These fluctuations will, of course, cause similar variations in the intensity of the light reaching the photocell 44. As a result, the resistance of the photocell 44 will be a function of the optical density of the specimen 12 and a function of the intensity of the light from the lamp 32. Not infrequently, it is the second function that produces the greatest change of resistance of the photocell 44.

In order to overcome this undesirable effect, the resistance in the fourth side 58 may be formed by a photocell 84 that is substantially identical to the first photocell 44. The lamp 32 is positioned so that the rays of light directed toward the two photocells 44 and 84 will always vary in the same manner. It may thus be seen that, ignoring the effects of the optical density of the specimen 12, the resistances of the two sides 52 and 58 will vary in identical manners and by the amounts. As a consequence, the variations of the lamp 32, even if over a large range will not cause unbalancing of the bridge 50.

The first pair of corners 60 of the bridge 50 are interconnected with the power supply section 22. This will be effective to maintain a potential between the two corners 60. Although this potential may be an alternating voltage, it has been found desirable to employ a DC voltage. In order to provide such a voltage, suitable rectifying means may be included in the power supply section 22. The rectifier means includes a device such as a diode 86 that will only permit pulses of one polarity to pass therethrough. A filter may be connected between the diode 86 and the conductor 38. The present filter includes a resistor 88 and a condenser 90 that will be effective to accumulate and maintain an electrical charge thereon as indicated. Since a relatively small amount of current is drawn from the rectifier means and an absolutely pure DC is not required, the condenser 90 will be effective to maintain the potential from the filter reasonably ripple-free. A dropping resistor 92 may be connected in series with the filter and the bridge so as to reduce the voltage between the corners 60 to less than the power line voltage.

The second pair of corners 62 are connected together by means of a meter 94 that is effective to visually indicate current flow. This meter 94 is preferably of a centered zero variety so that the needle may be deflected either plus or minus from the center position.

It will thus be seen that this meter 94 will be effective to indicate when the various sides 52 to 58 of the bridge 50 are all properly balanced. If the bridge 50 is unbalanced, the meter 94 will be effective to indicate the amount and the direction of unbalance. Normally, all readings are made when the bridge is in a balanced condition. Accordingly, it is not necessary for the meter 94 to have a linear movement. Instead, it may be the most sensitive near its zero reading and least sensitive at its maximum deflections.

The meter 94 will thus be very sensitive when it is near the center position. As a result, it will be effective to indicate the slightest unbalance of the bridge 50. However, when the bridge 50 is severely unbalanced, the meter 94 will be far less sensitive. This will prevent the movement being deflected so far as to cause any damage. In the event that the amount of unbalance may become so large as to damage the meter 94, voltage limiting means may be provided across the meter 94. In the present instance, a pair of diodes 96 and 98 are disposed in parallel to the meter 94 with their polarities reversed. Each of the diodes 96 and 98 requires a small amount of voltage thereacross before it will break down and conduct. Once the diode does become conductive, the voltage thereacross cannot rise above the breakdown voltage. By a proper choice of diodes 96 and 98, the breakdown voltage can be made lower than the level where the meter 94 will be damaged. However, the movement will still be deflected approximately full scale either way before either diode 96 or 98 becomes conductive.

In order to employ the present optical densitometer 10 for measuring the optical density of a specimen 12, the bridge circuit 50 is initially balanced for a zero reading. One of the first steps in this procedure is to balance the amounts of light incident on the two photocells 44 an 84. Also, the intensity of the incident light is placed in a range that will cause the photocells 44 and 84 to operate in that region 46 of the curve 48 having a logarithmic contour or at least very closely parallels the logarithmic manner in which the optical density varies.

In the present instance, the light intensity is controlled by placing a partition 100 between the lamp 32 and the photocells 44 and 84. The partition 100 is then provided with a separate aperture 102 and 104 for each cell 44 and 84 so as to allow two separate beams 106 and 108 to be directed toward the cells 44 and 84. These apertures 102 and 104 are made of a size that will limit the incident light to the desired range. A thumb screw 110 with a shutter 112 on the end thereof may be disposed adjacent the aperture 102 so as to permit it to be balanced against the other aperture 104.

The two beams 106 and 108 originate at those portions of the lamp 32 where the intensity is the most stable. Also, the beams 106 and 108 originate at portions of the lamp 32 that have identical intensities and any variations are by the same amounts. As a result, the light directed toward the two photocells 44 and 84 will be balanced.

A blank consisting of clear water in a test tube 26 may then be placed in the receptacle 18 so that the light incident on the photocell 44 will be attenuated by the optical density of the blank. The trimmer potentiometer 180 in the third side 56 which connected to the zero adjust 82 on the front face 16 may then be set in its middle position and the knob 66 for the potentiometer 70 rotated so that the indicia 74 on the indicator wheels indicate an optical density of 0, i.e., 100 percent transmission. Then by means of a screwdriver adjustment, the trimmer potentiometer 78 is adjusted until the meter 94 reads zero.

From this time on, the optical densitometer 10 should not require any further adjusting. However, it has been found desirable to periodically check the optical densitometer 10 to insure that it is in fact properly adjusted. If any variations do occur, they will be within a range that can be balanced by the adjustment of the zero adjust knob 82 and varying the setting of the trimmer 80. In order to avoid adjusting the knob 66 to produce a zero reading, a zero switch 114 may be disposed around the potentiometer 64. Closing this switch 114 will "short out" the potentiometer 64 and thereby insure a zero setting irrespective of the setting of the knob 66.

To measure the optical density of a specimen 12 at the wavelength of the light from the lamp 32, a test tube 26 containing the specimen 12 is placed in he receptacle 18. This will interpose a predetermined quantity of the specimen 12 between the lamp 32 and the photocell 44. As a result, the light incident on the photocell 44 will have its intensity attenuated by the optical density of the specimen 12. The light reaching the photocell 84 will not be affected. Accordingly, the difference between the two intensities will be a function of the optical density of the specimen 12. This will make the resistance of the photocell 44 differ from the resistance of the photocell 84 by the same function. This unbalancing of the resistances will then produce a current flow through the meter 94. The operator may then adjust the control knob 66 until the meter 94 is centered and thereby indicates the bridge 50 is balanced. The indicia 74 in the center of the control knob will then indicate the optical density of the specimen 12. It should be noted that since the meter 94 is most sensitive when it is centered, any unbalance in the bridge 50 can be very accurately noted. If the indicator wheels are precisely related to the setting of the potentiometer 70, they may then very precisely indicate the optical density of the specimen. By way of example, in one operative embodiment, it was found that the optical density could be accurately determined to three significant places.

When the specimen 12 has a high optical density or is quite opaque, the intensity of the light incident on the photocell 44 will be very low. Heretofore in this range of densities it has been very difficult, if not impossible, to measure small changes in the density. In many types of measurements, these changes are of a very major importance. However, in the present optical densitometer 10, in this range of densities the photocell 44 becomes progressively more sensitive. In other words, even small changes in the density will cause very large changes in the resistance of the photocell 44 since the photocell 44 is operating on the steepest portion of the curve 48. As a consequence, the smallest changes in optical density can be easily detected and accurately measured. It should be noted that as the optical density decreases toward 0, the sensitivity of the photocell 44 also decreases. This has at least two very important advantages. First, in spite of its high sensitivity in the high optical density region, optical densitometer 10 will still have an adequate range to measure extremely low optical densities.

Second, by the choice of a photocell 44 having a response curve 48 that has at least the portion 46 thereof substantially logarithmic and by operating the optical densitometer 10 in the portion 46 of the curve 48, the contact 68 will be moved logarithmically in the same manner that the optical density varies. This, in turn, will result in the indicia 74 on the indicator wheels being linearly spaced. As a result, the indicia are uniformly spaced and the indicia not crowded into one end of the scale. This will, in turn, permit the optical density to be very easily directly read in all portions of the scale.

While only a single embodiment of the present invention is disclosed and described herein, it will be readily apparent to persons skilled in the art that numerous changes and modifications may be made without departing from the scope of the invention. For example, the present optical densitometer 10 may be employed for measuring the optical densities of a wide variety of specimens whether they are in solid form or liquid. Also, by varying the type of lamp and selecting the appropriate photocell the optical densitometer may be made to operate at any wavelength. In addition, if it is desired to measure the optical density at a specific wavelength, a monochromatic light source or suitable filter may be employed to allow only monochromatic light of that wavelength to pass through the specimen and reach the photocell. Accordingly, the foregoing disclosure and description thereof are for illustrative purposes only and do not in any way limit the invention which is defined only by the claims which follow.

I claim:

1. An optical densitometer for measuring the optical density of a specimen at a predetermined wavelength, including the combination of:
    a. a bridge circuit having four electrically separate sides,
    b. a first photoresistive cell disposed in a first side of said bridge circuit and having a resistance that varies as a predetermined nonlinear function of the intensity of the light incident thereon,
    c. a second photoresistive cell disposed in a second side of said bridge circuit and having a resistance that varies as a predetermined nonlinear function of the intensity of the light incident thereon,
    d. a source of light effective to radiate first and second separate beams of light and said wavelength onto said first and second photoresistive cells, respectively,
    e. means for positioning said specimen between said light source and said first photoresistive cell whereby the light beam incident upon said first photoresistive cell has an intensity which differs from the intensity of the light incident upon said second photoresistive cell by an amount that is a function of the optical density of said specimen at said wavelength,
    f. first indicating means operatively disposed in said bridge circuit to indicate the amount of unbalance present in said bridge as a result of the difference in the resistances of said photoresistive cells,
    g. resistance means disposed in a third side of said bridge circuit and variable through a range of resistance effective to balance said bridge circuit, thereby nulling said first indicating means, and
    h. second indicating means coupled to said last-mentioned resistance means, said second indicating means being linearly calibrated in units of optical density and indicating the change in resistance of said resistance means which is required to null said first indicating means.

2. An optical densitometer as defined in claim 1 in which said bridge circuit is a Wheatstone bridge.

3. An optical densitometer as defined in claim 2 in which the resistance of each of said photoresistive cells varies as a predetermined logarithmic function of the intensity of the light incident thereon.

4. An optical densitometer as defined in claim 3 in which said predetermined function of said resistances varies at a greater rate when the incident light is of one intensity and at a lesser rate when the incident light is of another intensity.

5. An optical densitometer as defined in claim 4 in which said bridge is adjusted so that said first photoresistive cell operates in a region of its logarithmic nonlinear resistance curve such that said region compensates for the nonlinearity in the light incident on said first photoresistive cell, resulting in a linear output being read by said second indicating means that is directly proportional to the optical density of said specimen.

6. An optical densitometer as defined in claim 5 in which said first indicating means is a zero-centered meter, and including, in addition, a pair of parallel-connected diodes disposed in reversed polarity and in parallel across said meter, said diodes having breakdown voltage so as to limit the maximum voltage that may appear across said meter.

7. An optical densitometer as defined in claim 2 in which said first indicating means is coupled to the connection between said photoresistive cells.

* * * * *